United States Patent [19]

Adachi et al.

[11] Patent Number: 4,504,534
[45] Date of Patent: Mar. 12, 1985

[54] CORE MATERIAL FOR AUTOMOBILE BUMPERS

[75] Inventors: Akira Adachi, Sakura; Takashi Kubota, Utsunomiya; Yukio Okada, Fujisawa; Kenichi Miyazaki, Machida; Taro Hagiwara, Sagamihara, all of Japan

[73] Assignees: Japan Styrene Paper Corporation, Tokyo; Nissan Motor Company, Limited, Yokohama, both of Japan

[21] Appl. No.: 619,693

[22] Filed: Jun. 13, 1984

Related U.S. Application Data

[62] Division of Ser. No. 504,289, Jun. 14, 1983, abandoned.

[30] Foreign Application Priority Data

Jun. 19, 1982 [JP] Japan .................................. 57-105660

[51] Int. Cl.$^3$ ................................................ B32B 3/00
[52] U.S. Cl. .......................................... 428/71; 264/53; 264/DIG. 5; 264/DIG. 15; 264/DIG. 16; 264/DIG. 18; 293/120; 428/76; 521/56; 521/58; 521/60

[58] Field of Search ................... 428/71, 76; 293/120; 521/56, 58, 60

[56] References Cited

U.S. PATENT DOCUMENTS

| | | | |
|---|---|---|---|
| 3,616,172 | 10/1971 | Rubens | 428/71 |
| 4,075,380 | 2/1978 | Moens | 428/71 |
| 4,150,077 | 4/1979 | Slocomb | 264/53 |
| 4,256,803 | 3/1981 | Savey et al. | 428/71 |
| 4,324,834 | 4/1982 | Page et al. | 428/71 |
| 4,328,986 | 5/1982 | Weller et al. | 293/120 |
| 4,350,378 | 9/1982 | Wakamatsu | 293/120 |
| 4,361,352 | 11/1982 | Wakamatsu | 293/120 |
| 4,399,087 | 8/1983 | Akiyama et al. | 264/53 |
| 4,413,856 | 11/1983 | McMattan et al. | 293/120 |

*Primary Examiner*—Morton Foelak
*Attorney, Agent, or Firm*—Wenderoth, Lind & Ponack

[57] ABSTRACT

A core material for automobile bumpers which is composed of a molded article of foamed particles of a polypropylene-type resin. The molded article has a density of 0.015 to 0.045 g/cm$^3$ and a compression stress at 50% compression of at least 1 kg/cm$^2$. The core material simultaneously has excellent energy absorbing property and dimensional recovery and a low density.

3 Claims, 3 Drawing Figures

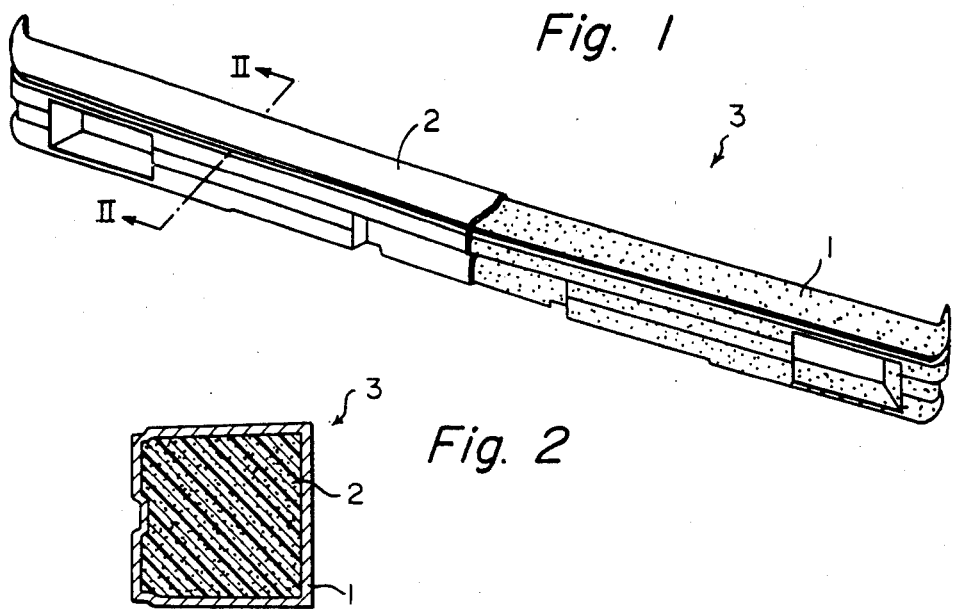
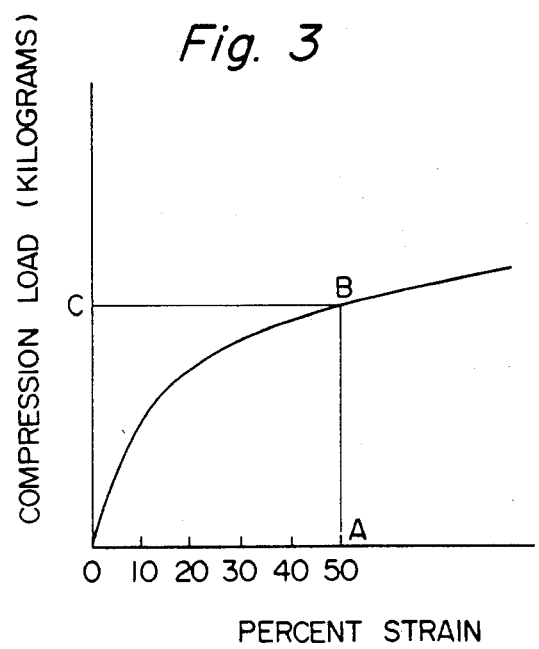

CORE MATERIAL FOR AUTOMOBILE BUMPERS

This application is a division of now abandoned application Ser. No. 504,289, filed June 14, 1983.

This invention relates to a core material for use in the production of automobile bumpers.

Conventionally, automobile bumpers are made of metallic bars. In recent years, however, with the need for lighter weights of automobiles to save energy, some plastic bumpers have been suggested to replace the metallic bumpers. The plastic bumpers are usually composed of a core material of a plastic foam and a surface material of a synthetic resin, etc. enclosing the foam core. Polyurethane, polyethylene and polystyrene foams have been proposed as the foam core material.

The foam core material is an important component part which affects the performance of an automobile bumper, and is generally required to have excellent energy absorbing property and dimensional recovery. Furthermore, to decrease the weight of an automobile, the bumper core material should be of low density.

The polyurethane foam proposed as a core material for bumpers has excellent energy absorbing property and dimensional recovery, but its density is high (usually 0.09 to 0.15 g/cm$^3$). Hence, it has a large weight and its cost is high. The polyethylene foam has the defect of being inferior in energy absorbing property and heat resistance. The polystyrene foam, on the other hand, has poor dimensional recovery and impact strength. Thus, the conventional core material for automobile bumpers have advantages and disadvantages, and no core material has been obtained which can simultaneously meet the three requirements (1), (2) and (3) for bumper cores. (1) They should have excellent energy absorbing properties. (2) They should have an excellent dimensional recovery. (3) They should be of low density for lighter weights of bumpers.

It is an object of this invention therefore to provide a core material for bumpers which meets all of the three requirements.

We have now found that the above object of the invention can be achieved by a molded article of foamed particles of a polypropylene-type resin, which has a density of 0.015 to 0.045 g/cm$^3$ and a compression stress at 50% compression of at least 1 kg/cm$^2$.

Thus, the present invention provides a core material for automobile bumpers, said core material being composed of a molded article of foamed particles of a polypropylene-type resin, said article having a density of 0.015 to 0.045 g/cm$^3$ and a compression stress at 50% compression of at least 1 kg/cm$^2$.

The polypropylene-type resin constituting the core material in accordance with this invention denotes a homopolymer of propylene or a copolymer of propylene with 1 to 30% by weight, preferably 1 to 5%, of an ethylenically unsaturated monomer copolymerizable with it. The polymer or copolymer may be a composition containing up to 40% by weight, preferably up to 30% by weight, of low-density polyethylene, an ethylene/vinyl acetate copolymer or both. An ethylene-propylene random copolymer is a preferred copolymer. The polypropylene-type resins may be crosslinked or non-crosslinked, but is preferably non-crosslinked.

The molded article of foamed particles of the polypropylene-type resin, which constitutes the core material of this invention, denotes a molded article obtained by feeding preliminarily foamed particles of the polypropylene-type resin in a mold capable of enclosing the particles but allowing escape of gases therefrom, and heating the foamed particles at a temperature at which the resin particles expand and soften and melt-adhere to each other into a mass, whereby a foamed molded article expanded to the same shape and size as the cavity of the mold is formed.

It has been found in accordance with this invention that the molded article of foamed particles has better energy absorbing property and dimensional recovery than an extruded and foamed article obtained by mixing a molten polypropylene-type resin with a blowing agent in an extruder, and extruding the mixture from the extruder to expand the resin.

According to one example of a method for producing the core material of the invention, preliminarily foamed particles are prepared by dispersing particles of the polypropylene-type resin and a volatile blowing agent in water in a closed vessel, heating the dispersion at a temperature at which the particles soften or at a higher temperature thereby impregnating the particles with the blowing agent, thereafter opening one end of the vessel, and while maintaining the pressure of the inside of the vessel at a predetermined value, releasing the particles and water into an atmosphere kept at a lower pressure than the inside of the vessel. Thereafter, the preliminarily foamed particles are pressurized and aged by using an inorganic gas or a mixture of it with a volatile blowing agent to impart an elevated pressure to the inside of the particles. Then, the preliminarily foamed particles are filled in a mold capable of enclosing the particles but allowing escape of gases therefrom. The particles are heated to expand them whereby the particles melt-adhere to each other to form a molded article having a shape conforming to the mold.

The method of producing the preliminarily foamed particles of the polypropylene-type resin and the method of producing a molded article from the resulting preliminarily foamed particles mentioned above are described in detail in, for example, Japanese Laid-Open Patent Publication Nos. 23834/1983 and 25334/1983.

In the past, it was difficult to produce molded articles of foamed particles of polypropylene-type resins. But their production has become easy by the development of the aforesaid methods.

The core material of the invention should have a density in the range of 0.015 to 0.045 g/cm$^3$, preferably 0.02 to 0.035 g/cm$^3$. If it is less than 0.015 g/cm$^3$, the core material has poor energy absorbing property. If it exceeds 0.045 g/cm$^3$, it has a poor dimensional recovery and cannot withstand use in automobile bumpers.

One embodiment of this invention is described below with reference to the accompanying drawings in which:

FIG. 1 is a perspective view of an automobile bumper having the core material of this invention, with a part of the outer covering material removed;

FIG. 2 is a longitudinal sectional view taken along line II—II of FIG. 1; and

FIG. 3 is a graph showing a stress-strain curve of the core material.

As shown in FIG. 1, a core material 1 of this invention for automobile bumpers is formed in substantially the same shape as a finished automobile bumper by molding preliminarily foamed particles of the polypropylene-type resin. The core material 1 so formed is covered with a surface covering material 2 made of polyurethane, polypropylene, polyethylene, etc. to produce an automobile bumper 3. The core material and the surface covering material may, or may not, be bonded into a one-piece structure by such means as adhesion or melt-adhesion. The core material 1 and the surface covering material 2 may also be molded into a one-piece structure. Or they may first be produced separately, and the covering material 2 may be applied to the core material 1.

The following examples specifically illustrate the production of the core material.

Examples and Comparative Examples

One hundred parts by weight of particles of each of the resins indicated in Table 1, dichlorodifluoromethane as a volatile blowing agent in each of the amounts indicated in Table 1, 0.5 part by weight of aluminum oxide as a dispersing agent and 300 parts by weight of water were put in a closed vessel. The resin particles, and the blowing agent were dispersed in water with the aid of the dispersing agent. With stirring, the dispersion was heated at 145° C. for 1 hour to impregnate the resin particles with the blowing agent. Then, one end of the vessel was opened, and while the pressure of the inside of the vessel was maintained at 35 kg/cm², the resin particles and water were simultaneously released into the open atmosphere.

The preliminarily foamed particles obtained were left to stand at room temperature and atmospheric pressure for 48 hours, and put in a pressurized vessel where they were pressurized and aged at a temperature of 20° C. under a pressure of 2 kg/cm².G. The aged particles were filled in a mold which could enclose the particles but allowed escape of gases therefrom and which had a cavity of the same shape as the intended core material, and heated with steam under 3.2 kg/cm².G to foam and expand them. Thus, a core material having the shape conforming to the cavity of the mold was obtained.

Table 1 summarizes the densities and compression stresses at 50% compression of the various core materials obtained.

The core materials were subjected to tests for the efficiency of energy absorption, dimensional recovery and heat resistance. The results are shown in Table 1.

In Comparative Examples 3 and 4, commercially available molded articles were used.

TABLE 1

|  |  | Base resin | Amount of blowing agent (parts by weight) | Properties of the core material ||||
|---|---|---|---|---|---|---|---|
|  |  |  |  | Density (g/cm³) | Compression stress at 50% compression (kg/cm²) | Efficiency of energy adsorption (*1) | Dimensional recovery (*2) | Heat resistance (*3) |
| Example | 1 | Ethylene/propylene random copolymer | 20 | 0.017 | 1.1 | O | ◉ | O |
|  | 2 | Ethylene/propylene random copolymer | 18 | 0.020 | 1.3 | O | ◉ | ◉ |
|  | 3 | Ethylene/propylene random copolymer | 16.5 | 0.030 | 1.6 | O | ◉ | ◉ |
|  | 4 | Ethylene/propylene random copolymer | 15 | 0.040 | 2.0 | O | ◉ | ◉ |
| Comparative Example | 1 | Ethylene/propylene random copolymer | 23 | 0.013 | 0.7 | X | ◉ | O |
|  | 2 | Ethylene/propylene random copolymer | 13 | 0.047 | 2.5 | O | X | ◉ |
|  | 3 | Low-density polyethylene | — | 0.030 | 0.6 | Δ | ◉ | X |
|  | 4 | Polystyrene | — | 0.030 | 2.5 | O | X | X |

(*1): Efficiency of energy absorption
A sample was compressed under the following conditions.
Sample temperature: 20° C.
Compression speed: 10 mm/min.
From the stress-strain curve shown in FIG. 3 which was obtained upon compression, the efficiency of energy absorption was calculated as follows:

Efficiency of energy absorption = $\frac{\text{(Area of OAB)}}{\text{(Area of OABC)}}$.

The result was evaluated on the following scale.
O: at least 70%
Δ: at least 50% but less than 70%
X: less than 50%
(*2): Dimensional recovery
The dimensional recovery is the percentage of the size of a sample measured 30 minutes after the compression test described in (*1) above based on the size of the sample before the compression test. The result was evaluated on the following scale.
◉: at least 90%
O : at least 80% but less than 90%
Δ: at least 70% but less than 80%
X: less than 70%
(*3): Heat resistance
The volume shrinkage of a sample after heating at 100° C. for 22 hours was measured, and the result was evaluated on the following scale.
◉: less than 10%
O : at least 10% but less than 20%
Δ: at least 20% but less than 50%
X: at least 50%

As is seen from the foregoing description, the core material of this invention can meet the three requirements for core materials of automobile bumpers. Specifically, it has excellent energy absorbing property, an excellent dimensional recovery, and a low density that is conductive to lighter weights of automobiles. Moreover, it is low in cost and also has superior heat resistance, impact strength, shape retention, dimensional accuracy and chemical resistance.

A core material made of a polystyrene foam may produce a sound of friction between it and a polyurethane outer covering material when it is subjected to an external force, and this sound is likely to detract from the marketing value of the bumper. The core material of this invention, however, does not produce such a frictional sound.

What is claimed is:

1. In an automobile bumper which is composed of a core material and a surface covering material, the improvement wherein said core material is composed of a molded article of foamed particles of a homopolymer of propylene or a copolymer of propylene with 1 to 30% by weight of an ethylenically unsaturated monomer copolymerizable with it, said molded article having a density of 0.015 to 0.045 g/cm$^3$ and a compression stress at 50% compression of at least 1 kg/cm$^2$, and the said surface covering material is a synthetic resin.

2. An automobile bumper of claim 1 wherein the copolymer is a random copolymer of ethylene and propylene with an ethylene unit content of 1 to 30% by weight.

3. An automobile bumper of claim 1 wherein the core material of claim 1 which has an energy absorption efficiency of at least 70% and a dimensional recovery of at least 90%, and when heated at a temperature of 100° C. for a period of 22 hours, a volume shrinkage of less than 20%.

* * * * *